Patented May 25, 1937

2,081,756

UNITED STATES PATENT OFFICE 2,081,756

ACID DYESTUFFS OF THE ANTHRAQUINONE SERIES

Frank Lodge and Colin Henry Lumsden, Blackley, Manchester, England, assignors to Imperial Chemical Industries Limited, a corporation of Great Britain No Drawing. Application March 14, 1935, Serial No. 11,162. In Great Britain July 12, 1934

12 Claims. (Cl. 260—59)

This invention relates to the manufacture of new anthraquinone acid dyestuffs of outstanding fastness properties. The invention relates more specifically to the production of new acid dyestuffs, by sulfonating anthraquinonyl alkyl ($C_8$—$C_{20}$) sulfides which carry in the anthraquinone nucleus auxochromic groups such as amino, alkylamino, hydroxyalkylamino, arylamino, hydroxy, aryloxy, benzyl-mercapto, etc., or by treating 1-amino-2-chloro- or bromo-anthraquinonyl alkyl ($C_8$—$C_{20}$) sulfides carrying auxochromic groups with agents adapted to replace the chloro or bromo substituent by a sulfonic acid group, or by treating mercapto-anthraquinone sulfonic acids carrying auxocromic groups as mentioned above, with a long chain alkyl ($C_8$—$C_{20}$) chloride or bromide, or by treating the corresponding chloro- or bromo-anthraquinone sulfonic acids also carrying auxochromic groups with long chain alkyl ($C_8$—$C_{20}$) mercaptans.

The anthraquinonyl alkyl sulfides carrying the auxochromic groups, and also halogen if desired, as above mentioned, may be prepared by causing the mercapto-anthraquinone carrying such auxochromic groups, and if desired also halogen, to react with long chain ($C_8$—$C_{20}$) alkyl chlorides or bromides, or by causing a chloro- or bromo-anthraquinone carrying auxochromic groups to react with long chain ($C_8$—$C_{20}$) alkyl mercaptans.

These new dyestuffs have soap-like properties in aqueous solution. They are readily dyed by the methods used for the dyeing of acid wool colors, although preferably they are dyed from a bath more weakly acid than usual, e. g., an acidity such as obtained by using ammonium acetate as the source of acid. The dyeings so obtained have exceptional fasteness to washing and milling, comparable with the fastness of chrome-mordant dyestuffs.

The invention is illustrated but not limited by the following examples, in which the parts used are by weight.

Example 1

10 parts of 1-amino-4-anilino-2-anthraquinonyl dodecyl sulfide are dissolved, with stirring, in 100 parts of 100% sulfuric acid at 10-15° C. To the solution, 25 parts of "oleum" (25% $SO_3$) are slowly added, the mixture being stirred and the temperature kept at 15-20° C. When all is in, the temperature is raised to 25° C. for about half an hour, i. e. until a test shows that sulfonation is complete. The mixture is then run into 350 parts of ice-water. The precipitated dyestuff is filtered off, stirred into 700 parts of water, enough aqueous caustic soda is added to make the liquor neutral, it is warmed to about 70° C. and the dyestuff is salted out by adding 140 parts of salt. It is filtered off at 40° C., washed with 5% brine, and dried, preferably at about 50-70° C.

The new dyestuff is a blue powder which dissolves in warm water to give a soapy blue solution. When it is dyed on wool from soft water, acidified by means of acetic acid, it gives a blue shade of outstanding fastness to severe washing and milling.

Example 2

For this example, 1-amino-4-p-anisidino-2-mercapto-anthraquinone-sulfonic acid is made as follows:

12 parts of 2-bromo-1-amino-4-p-anisidinoanthraquinone are dissolved in 120 parts of 100% sulfuric acid and 20 parts of "oleum" (25% $SO_3$) are added at 20-25° C. The product is isolated by pouring into ice-water, filtering off, stirring the paste into 700 parts of water and adding caustic soda until neutral and precipitating by adding 50 parts of salt. It is filtered cold and drained well. The resulting paste is mixed with 120 parts of water and 12 parts of a 30% aqueous solution of sodium hydrosulfide and boiled with stirring for half an hour.

To a solution of 1-amino-4-p-anisidino-2-mercapto-anthraquinone-sulfonic acid obtained as described, 10 parts of dodecyl bromide are added and the mixture boiled for 1 hour. The dyestuff is filtered cold, purified by heating with 3 parts of active carbon in 700 parts of hot water, filtering and precipitating from the filtrate by adding salt, filtering and drying at 50° C.

The new dyestuff dyes wool from a weakly acid bath in greenish-blue shades of outstanding fastness to severe washing and milling.

Example 3

1-amino-4-anilino-2-anthraquinonyl cetyl sulfide is converted to a water-soluble dyestuff in a similar manner to that described in Example 1.

Example 4

1-amino-4-hydroxyethylamino-2-anthraquinonyl dodecyl sulfide is converted to a new water-soluble dyestuff either by treating with 100% sulfuric acid or by heating with pyridine and sodium pyro-sulfate.

The dyestuff dyes wool in reddish-blue shades having very good fastness to washing and milling.

*Example 5*

1 part of 1,4-diamino-2-p-cresyloxy-3-anthraquinonyl dodecyl sulfide is sulfonated by stirring with 10 parts of 100% sulfuric acid at 30° C. for 1 hour. The reaction mixture is worked up as in Example 1 and yields a violet dyestuff which has excellent affinity for wool, which it dyes in bright violet shades having good fastness to severe washing and milling.

*Example 6*

The p-cresol derivative used in Example 5 is replaced by an equal weight of the corresponding o-cresol derivative.

The new dyestuff dyes violet shades on wool having fastness properties similar to those of Example 5.

*Example 7*

The p-cresol derivative used in Example 5 is replaced by an equal weight of the corresponding m-cresol derivative.

The new dyestuff dyes violet shades on wool, having fastness properties similar to those of Example 5.

*Example 8*

1,4 - diamino - 2 - phenoxy - 3 - anthraquinonyl cetyl sulfide is sulfonated by stirring at 20–30° C. with 10 times its weight of 100% sulfuric acid.

The new dyestuff dyes violet shades on wool which have outstanding fastness to washing and milling.

*Example 9*

50 parts of 2-chloro-1,4-diamino-3-anthraquinonyl dodecyl sulfide, 240 parts of phenol, 100 parts of sodium sulfite crystals and 150 parts of water are stirred in a closed vessel at 170° C. for 8 hours. The phenol is removed by steam, the color filtered hot from insoluble impurities and 100 parts of salt added. After cooling and filtering the crude color it is purified by treating with active carbon in water.

The new dyestuff is a blue powder which dissolves readily in hot water to a bright blue solution. Dyed from a weakly acid bath bright blue shades are obtained having excellent fastness to severe washing and milling.

*Example 10*

The 2 - chloro - 1,4 - diamino-3-anthraquinonyl dodecyl sulfide of Example 9 is replaced by an equal weight of 2-chloro-1,4-diamino-3-anthraquinonyl cetyl sulfide. The new dyestuff has similar properties to those of Example 9.

*Example 11*

1 part of 1,4-diamino-2-benzylmercapto-3-anthraquinonyl dodecyl sulfide is sulfonated by stirring with 10 parts of 100% sulfuric acid at 20° C. for 1 hour. The reaction mixture is worked up as in Example 1 and yields a dyestuff which has excellent affinity for wool, which it dyes in reddish-blue shades having very good fastness to severe washing and milling.

We claim:

1. A sulfonated anthraquinonyl alkyl sulfide carrying at least one auxochromic group in an alpha position of the anthraquinone radical, and in which the alkyl group contains from 8 to 20 carbon atoms.

2. A sulfonated anthraquinonyl-beta-alkyl sulfide carrying at least one auxichromic group in an alpha position of the anthraquinone radical, and in which the alkyl group contains from 8 to 20 carbon atoms.

3. A sulfonated alpha-amino-anthraquinonyl alkyl sulfide in which the alkyl group contains from 8 to 20 carbon atoms.

4. A sulfonated alpha-amino-anthraquinonyl alkyl sulfide in which the alkyl group contains from 8 to 20 carbon atoms and which contains at least one additional auxochromic group in the anthraquinone radical.

5. A sulfonated alpha-amino-anthraquinonyl-beta-alkyl sulfide in which the alkyl group contains from 12 to 16 carbon atoms.

6. A sulfonated 1-amino-anthraquinonyl-2-alkyl sulfide in which the alkyl group contains from 8 to 20 carbon atoms.

7. A sulfonated 1-amino-anthraquinonyl-2-alkyl sulfide in which the alkyl group contains from 8 to 20 carbon atoms and which contains an auxochromic group in the 4-position.

8. A sulfonated 1 - amino - anthraquinonyl-2-alkyl sulfide in which the alkyl group contains from 8 to 20 carbon atoms and which contains an ether group in the 3-position.

9. The process which comprises sulfonating an anthraquinonyl alkyl sulfide carrying an auxochromic group in an alpha position of the anthraquinonyl group and from 8 to 20 carbon atoms in the alkyl radical.

10. The process which comprises treating a 1-amino-2-halogeno-anthraquinonyl alkyl sulfide containing from 8 to 20 carbon atoms in the alkyl group with reagents adapted to replace the 2-halogen by a sulfonic acid group.

11. The process which comprises sulfonating an alpha-amino-anthraquinonyl-alkyl sulfide in which the alkyl group carries from 8 to 20 carbon atoms.

12. The process which comprises sulfonating an alpha-amino-anthraquinonyl-beta-alkyl sulfide which carries additional auxochromic groups in the anthraquinone nucleus and from 8 to 20 carbon atoms in the alkyl radical.

FRANK LODGE.
COLIN HENRY LUMSDEN.